A. P. WIGHT.
OIL ATOMIZER FOR STEAM CONDUITS.
APPLICATION FILED AUG. 3, 1916.
1,228,862.
Patented June 5, 1917.
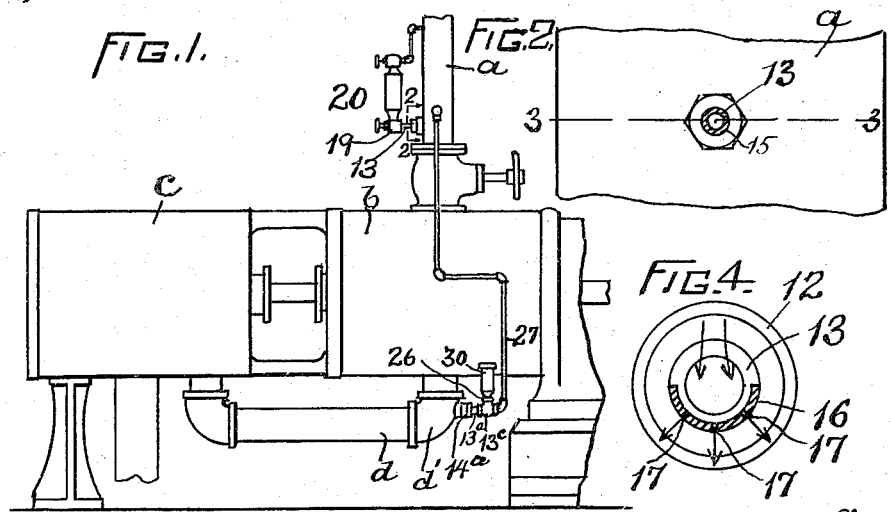
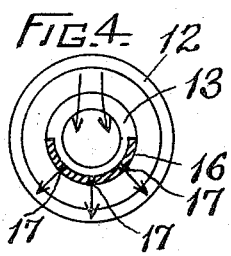
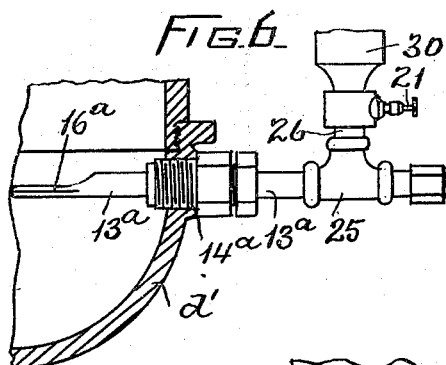
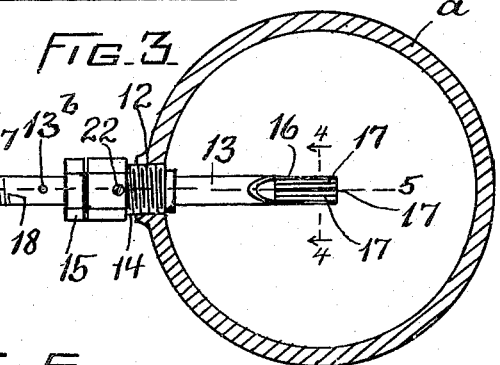
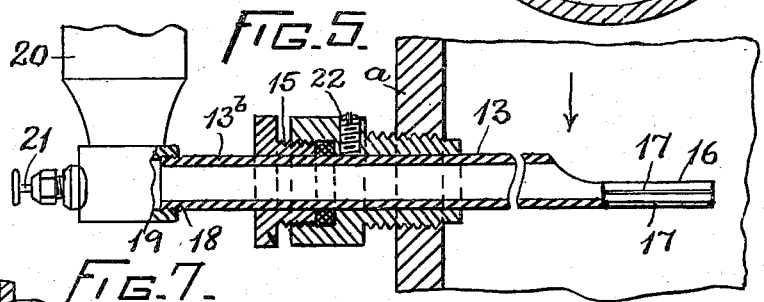
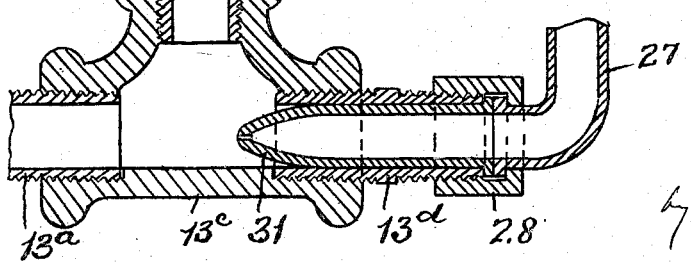
INVENTOR:
A. P. Wight
by Wight Brown Quinby May
ATTYS

UNITED STATES PATENT OFFICE.

ALBION P. WIGHT, OF WAKEFIELD, MASSACHUSETTS.

OIL-ATOMIZER FOR STEAM-CONDUITS.

1,228,862. Specification of Letters Patent. Patented June 5, 1917.

Application filed August 3, 1916. Serial No. 113,006.

*To all whom it may concern:*

Be it known that I, ALBION P. WIGHT, a citizen of the United States, residing at Wakefield, in the county of Middlesex and State of Massachusetts, have invented new and useful Improvements in Oil-Atomizers for Steam-Conduits, of which the following is a specification.

This invention has for its object to provide, as an attachment for a conduit which supplies steam to an engine cylinder, an atomizer adapted to introduce cylinder lubricating oil into said conduit and to so deliver the oil that it will be atomized by the steam and carried thereby in a finely subdivided condition to the cylinder.

The invention is embodied in the improvements hereinafter described and claimed.

Of the accompanying drawings forming a part of this specification:

Figure 1 represents a side elevation of a tandem compound steam engine, the conduits conveying steam to the cylinders being provided with oil atomizers embodying the invention;

Fig. 2 represents a section on line 2—2 of Fig. 1;

Fig. 3 represents a section on line 3—3 of Fig. 2;

Fig. 4 represents a section on line 4—4 of Fig. 3;

Fig. 5 represents a section on line 5—5 of Fig. 3, and a side view of a portion of the oil cup shown at the upper part of Fig. 1;

Fig. 6 represents an enlargement of a portion of Fig. 1, a part being shown in section;

Fig. 7 represents a sectional view of a portion of the structure shown by Fig. 6.

The same reference characters indicate the same or similar parts in all the views.

In the drawings, $a$ represents a conduit which supplies steam to an engine cylinder $b$, said conduit having a tapped orifice 12 (Fig. 3) constituting a member of the coupling which connects my improved oil atomizer with said conduit.

Said atomizer comprises a tubular oil conduit terminal 13 extending horizontally through the orifice 12, and provided with a loose collar 14 which is externally threaded to engage the internal thread of said orifice, said collar constituting the complemental member of the above mentioned coupling. The collar is provided with a stuffing box including a gland 15, and adapted to form a steam-tight joint around the terminal 13.

The delivering or inner end of the terminal 13 is cut away at one side to form a spoon or trough-shaped nozzle 16, which when in use is arranged with its open side upward. Said nozzle is provided with a plurality of contracted passages 17, which are preferably narrow slots or slits extending lengthwise of the nozzle, and arranged to conduct small streams of oil from the open upper side to the lower side of the nozzle.

The outer or receiving end of the terminal 13 has an external screw thread 18, and is adapted thereby to engage a portion 19 of an oil conduit, said portion, as here shown, being connected with an oil cup 20 and adapted to conduct oil from said cup to the terminal 13. The flow of oil from the cup may be regulated by a needle valve, the stem 21 of which is shown by Fig. 5.

The collar 14 is provided with means such as a set screw 22, whereby it may be adjustably secured to the terminal 13 to insure the location of the nozzle 16 at the central portion of the conduit $a$. The terminal 13 is provided with a suitable indicator, such as a prick punch indentation 13$^b$, to indicate the position of the open side of the nozzle.

When the described atomizing attachment is installed as shown and described, oil entering the terminal 13 passes downwardly through the contracted passages 17 of the nozzle, its flow being accelerated by the pressure of steam passing through the conduit $a$. The oil is thus finely subdivided or atomized and is carried in this condition to the cylinder $b$.

When the engine is of the compound type and has a high pressure cylinder $b$ and a low pressure cylinder $c$, the conduit $a$ conducts high pressure steam, and the two cylinders are connected by a low pressure steam conduit $d$.

I have shown an atomizing attachment of the above described construction applied to the low pressure conduit $d$, 13$^a$ being the terminal, having a trough-shaped nozzle 16$^a$, and 14$^a$ the sleeve which couples the terminal to the conduit $d$, the sleeve and terminal as here shown entering the vertical portion of an elbow $d'$ forming a part of the conduit $d$.

In this embodiment of the invention the terminal 13$^a$ includes a T coupling 13$^c$ adapted to be connected with an oil conduit portion 26, and an extension 13$^d$ having a union 28 adapted to be coupled to a by-pass 27 which conducts steam from the high pressure conduit $a$ to the terminal 13$^a$.

The oil conduit portion 26 communicates with an oil cup 30 (Figs. 1 and 6).

The extension 13$^d$ may have a reducing nozzle 31 terminating in the coupling 25, as shown by Fig. 7.

High pressure steam delivered by the reducing nozzle heats and reduces the viscosity of the oil supplied to the terminal 13$^a$ and facilitates the atomization of the oil by the low pressure steam in the conduit $d$.

The collar 14, having a stuffing box and set screw whereby the conduit terminal may be adjustably secured to the collar, enables the spoon or nozzle to be adjusted to occupy the central portion of a steam pipe of any diameter, it being very desirable that the nozzle be centrally located in the steam pipe.

Having described my invention, I claim:

1. An oil atomizer comprising a tubular conduit having its end portion cut away to provide a nozzle substantially U-shaped in cross section, said nozzle having one or more longitudinal slits for the passage of oil, and means for attaching said atomizer to a steam inlet pipe so as to permit rotary and sliding movements, independent of each other, of the nozzle in said pipe, said nozzle, when in use, having its open side facing the flow of steam through said pipe.

2. An oil atomizer comprising a tubular oil conduit terminal cut away at one side of its delivering or inner end to form a nozzle substantially U-shaped in cross section which is provided with longitudinal slits adapted to conduct small streams of oil from the inner to the outer surface of the nozzle, said terminal being formed at its outer or receiving end for engagement with an oil supply conduit, and an externally threaded sleeve embracing said terminal, adapted to engage an internally threaded orifice in a steam conduit, and provided with a stuffing box, the said terminal when in use being confined horizontally with the open side of its nozzle upward to cause oil to pass downwardly through the contracted passages of said nozzle and expose the oil to steam pressure tending to force it through said passages.

3. An oil atomizer comprising a tubular oil conduit terminal cut away at one side of its delivering or inner end to form a nozzle substantially U-shaped in cross section which is provided with contracted oil passages adapted to conduct small streams of oil from the inner to the outer surface of the nozzle, said terminal being formed at its outer or receiving end for engagement with an oil supply conduit, and an externally threaded sleeve embracing said terminal, adapted to engage an internally threaded orifice in a steam conduit, and provided with a stuffing box, said terminal having external means indicating the position of the open side of the nozzle, which open side faces the flow of steam through said steam conduit when the atomizer is in use.

4. An oil atomizer comprising a tubular oil conduit terminal cut away at one side of its delivering or inner end to form a trough-shaped nozzle, which nozzle is open throughout its length at one side and is provided with contracted oil passages adapted to conduct small streams of oil from the inner to the outer surface of the nozzle, said terminal being formed at its outer or receiving end for engagement with an oil supply conduit, and an externally threaded sleeve embracing said terminal, adapted to engage an internally threaded orifice in a steam conduit, and provided with a stuffing box, said sleeve having means whereby it may be adjustably clamped to said terminal to locate the nozzle in the central portion of the conduit, said nozzle, when in use, having its open side facing the flow of steam through said steam conduit.

In testimony whereof I have affixed my signature.

ALBION P. WIGHT.

Copies of this patent may be obtained for five cents each, by addressing the "Commissioner of Patents, Washington, D. C."